United States Patent [19]

Hollowed et al.

[11] Patent Number: 5,157,722
[45] Date of Patent: Oct. 20, 1992

[54] HOLDER AND LATCHING MECHANISM FOR A HAND-HELD TELEPHONE

[75] Inventors: Edward J. Hollowed, Naperville; Jerome L. Oldani, Aurora, both of Ill.

[73] Assignee: GTE Airfone Incorporated, Oakbrook, Ill.

[21] Appl. No.: 288,940

[22] Filed: Dec. 23, 1988

Related U.S. Application Data

[63] Continuation-in-part of Ser. No. 138,182, Dec. 28, 1987, Pat. No. 4,811,387.

[51] Int. Cl.⁵ .................. H04M 1/11; H04M 17/02
[52] U.S. Cl. ............................ 379/428; 379/144; 379/455; 379/58
[58] Field of Search ............... 379/154, 144, 143, 428, 379/455, 58, 59

[56] References Cited

U.S. PATENT DOCUMENTS 4,811,387 3/1989 Hollowed et al. .................. 379/144

Primary Examiner—Stafford D. Schreyer

[57] ABSTRACT

A telephone holder and latching mechanism for use in conjunction with a hand-held, credit-card telephone in, for example, a commercial aircraft is disclosed. An integrally formed face plate, an integrally formed handset holder, and an integrally formed latching mechanism cooperate to firmly secure a hand-held telephone in a cavity of the holder while discouraging unnecessary tampering and permitting easy removal of the telephone when desired. A first end of the telephone includes a collar which fits into a collar opening at one end of the cavity. An opposing end of the cavity has a latching opening that permits a finger from the latching mechanism to extend therethrough. The latching mechanism is spring-loaded so that the finger is urged through the latching opening. A second end of the telephone incorporates a latching protrusion which the finger engages when the telephone is secured in the holder. A slot in the face plate is dimensioned to accommodate a credit card and prevent insertion of larger objects. When the credit card is inserted through the slot, it engages the latching mechanism, causing the latching mechanism to pivot in opposition to the spring to disengage the finger from the handset. Compressive resilient members located in the cavity then push the telephone outward from the cavity. Further action of the finger against a ramped surface of the latching protrusion moves the telephone further outward.

1 Claim, 2 Drawing Sheets

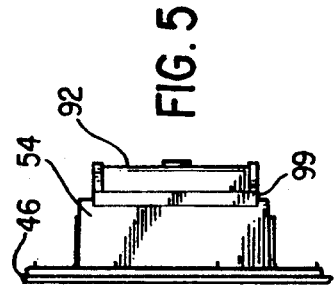
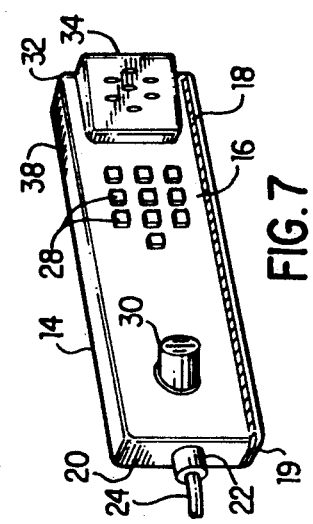
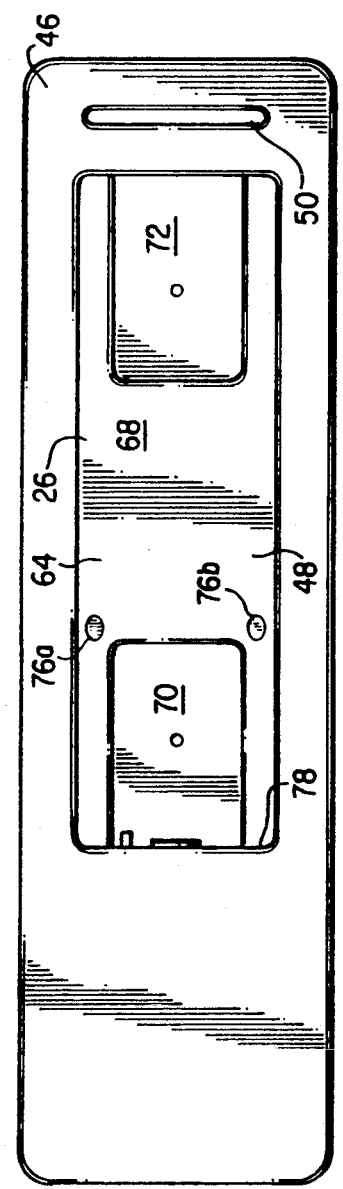
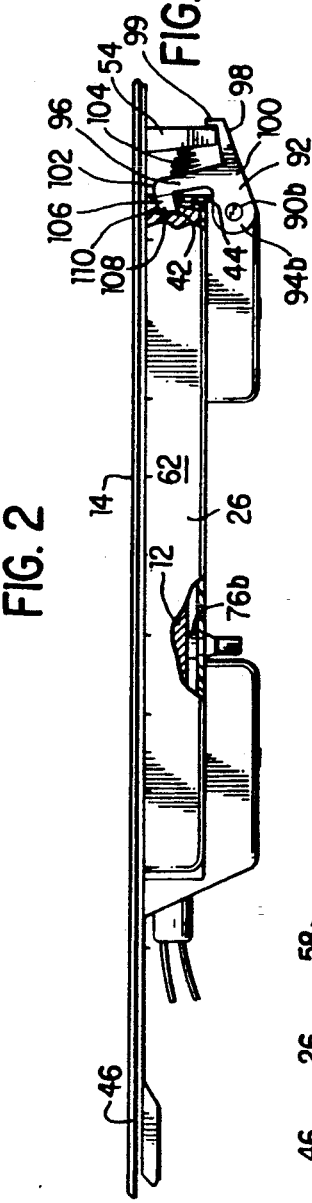
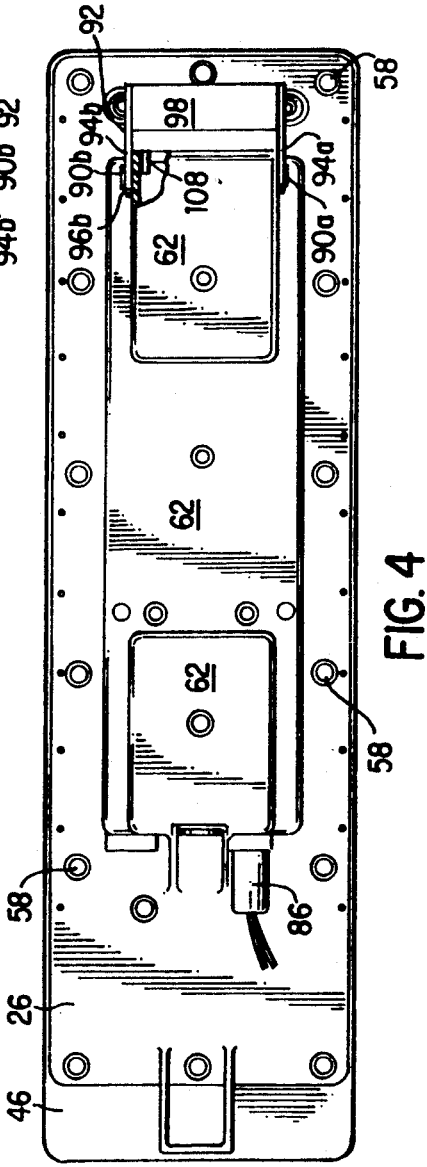

HOLDER AND LATCHING MECHANISM FOR A HAND-HELD TELEPHONE

CROSS REFERENCE TO RELATED APPLICATIONS

This application is a Continuation-In-Part of U.S. Pat. application Ser. No. 138,182, now U.S. Pat. No. 4,811,387, filed Dec. 28, 1987, and entitled "Holder and Credit-Card Unlatching Mechanism for a Hand-Held Telephone." Cross reference is also made to the related U.S. Patent application entitled, "Hand-Held Pay Telephone and Holder," application Ser. No. 138,172, U.S. Pat. No. 4,881,254 filed on Dec. 28, 1987.

TECHNICAL FIELD OF THE INVENTION

The present invention relates to the field of telephone pay stations and, more particularly, to telephone pay station apparatus adapted for mounting in the passenger area of a vehicle, such as a commercial aircraft.

BACKGROUND OF THE INVENTION

Public pay telephones were introduced in the 1880's. In general, operation of such pay telephones required the deposit of a coin in order to unlock some mechanism, for example, the crank with which the user signalled the operator or a sliding door in front of the mouthpiece. On occasion, the entire telephone was enclosed in a locked box that could be opened only with the deposit of a coin, qua key. One arrangement reversed the usual scheme and enclosed the telephone in a booth having a door that locked behind the telephone user. After having made his call, the user could escape only by depositing a coin in the doorlock. Only rarely did the early arrangements provide any means for refunding the user's payment in the event that the call could not be completed. An early attempt to remedy this difficulty relied on nothing more than a piece of string.

For many years, the common form of telephone pay station included several slots for the deposit of coins of varying denominations. A typical arrangement allowed the deposit of nickels, dimes and quarters so that payment of various amounts could be utilized in connection with the pay station. This arrangement was first used with so-called manual telephones in which often the initial deposit of a single coin worked to signal the operator that a call was sought to be placed. Additional coins were added for payment of calls of longer duration or for calls to long-distance locations. Internal arrangements of gongs transmitted various sounds back to the operator and gave the operator an indication of proper coin deposit.

Ultimately, telephone pay stations became dial operated, and an operator would normally not be required in order to place local calls. Various arrangements for actuating the equipment and for accepting and returning coins were developed, including, ultimately, electronic totalizers that were able to count and accurately register the number and denominations of coins deposited. Such totalizers also facilitated the development and utilization of so-called single-slot pay stations, wherein a single slot accepted coins of various denominations, eliminating the traditional three-slot design that had been utilized for many years. Pay telephones that accept credit cards represent a much more recent development that has found widespread use within the past decade. Such arrangements, typically found in airports, railroad stations, etc., have been well received by business travelers, largely because credit-card telephones mitigate the need to carry the many coins required to place telephone calls, particularly long-distance calls.

In the United States today, more people use public telephones more often than in any other country in the world, and the subsequent installation and adaptation of public telephones to different environments has been limited only by the imagination. As a result, significant experimentation has been done in connection with the deployment of pay telephones in other than conventional environments. The deployment of telephone pay stations on railcars, particularly on deluxe passenger trains, has been experimented with from time to time. However, the most recent development and adaptation of the pay station has permitted use in commercial aircraft. Credit-card-accepting pay stations have been incorporated into commercial aircraft where, by means of radio-telephone links, telephone service can be made by the user from the commercial aircraft to ground-based telephone equipment.

With regard to the placement of telephone pay stations on board commercial aircraft, the telephones themselves have typically been installed on bulkheads located adjacent to flight-attendant stations. This arrangement requires the user to leave his seat to go to the location of the on-board pay station to initiate the call. If the pay station is equipped with a wireless telephone unit, the flight attendant often becomes involved in providing the user with the hand-held telephone. Such arrangements fail to afford the convenience, and perhaps the privacy, that an aircraft passenger might desire in connection with the placement of a call.

Accordingly, it is an object of the present invention to provide a new and more effective telephone pay station for use on board in-flight commercial aircraft or in similar other vehicular environments where convenience of utilization and ready access facilitates and encourages use of such pay telephones. In addition, another object of the present invention is to provide a telephone pay station that securely retains a telephone so that it does not become disengaged from its holder when a reasonable amount of vibration and jostling is encountered. Moreover, yet another object of the present invention is to provide a telephone pay station that discourages tampering but which easily releases a telephone when desired. Still another object of the present invention is to provide a telephone pay station that is relatively inexpensive to manufacture so that cost constraints permit it to be located in a large number of locations.

DISCLOSURE OF THE INVENTION

The above and other objects, advantages, and capabilities are realized in conjunction with a hand-held, credit-card telephone for use aboard, for example, commercial aircraft, by a telephone holder and a latching mechanism. The holder includes a holder cavity of generally longitudinal construction. A face plate with an opening which accommodates the telephone attaches to the holder. The latching mechanism attaches to the holder to selectively latch and unlatch the telephone in the cavity in response to the insertion of an implement, such as a credit card, through the face plate to operate the latching mechanism.

BRIEF DESCRIPTION OF THE DRAWINGS

A more complete understanding of the present invention may be derived by referring to the detailed description and claims when considered in connection with the FIGURES, wherein like reference numbers refer to common items throughout the FIGURES, and:

FIG. 2 is a front plan view of a telephone holder in accordance, with the present invention;

FIG. 3 is a bottom plan view of a telephone holder in accordance, with the present invention;

FIG. 4 is a rear plan view of a telephone holder in accordance with the present invention;

FIG. 5 is a right end view of a telephone holder in accordance with the present invention;

FIG. 6 is a left end view of a telephone holder in accordance with the present invention; and FIG. 7 is a perspective view of a hand-held pay station telephone in accordance with the present invention.

DETAILED DESCRIPTION OF A PREFERRED EMBODIMENT

Figure 1:
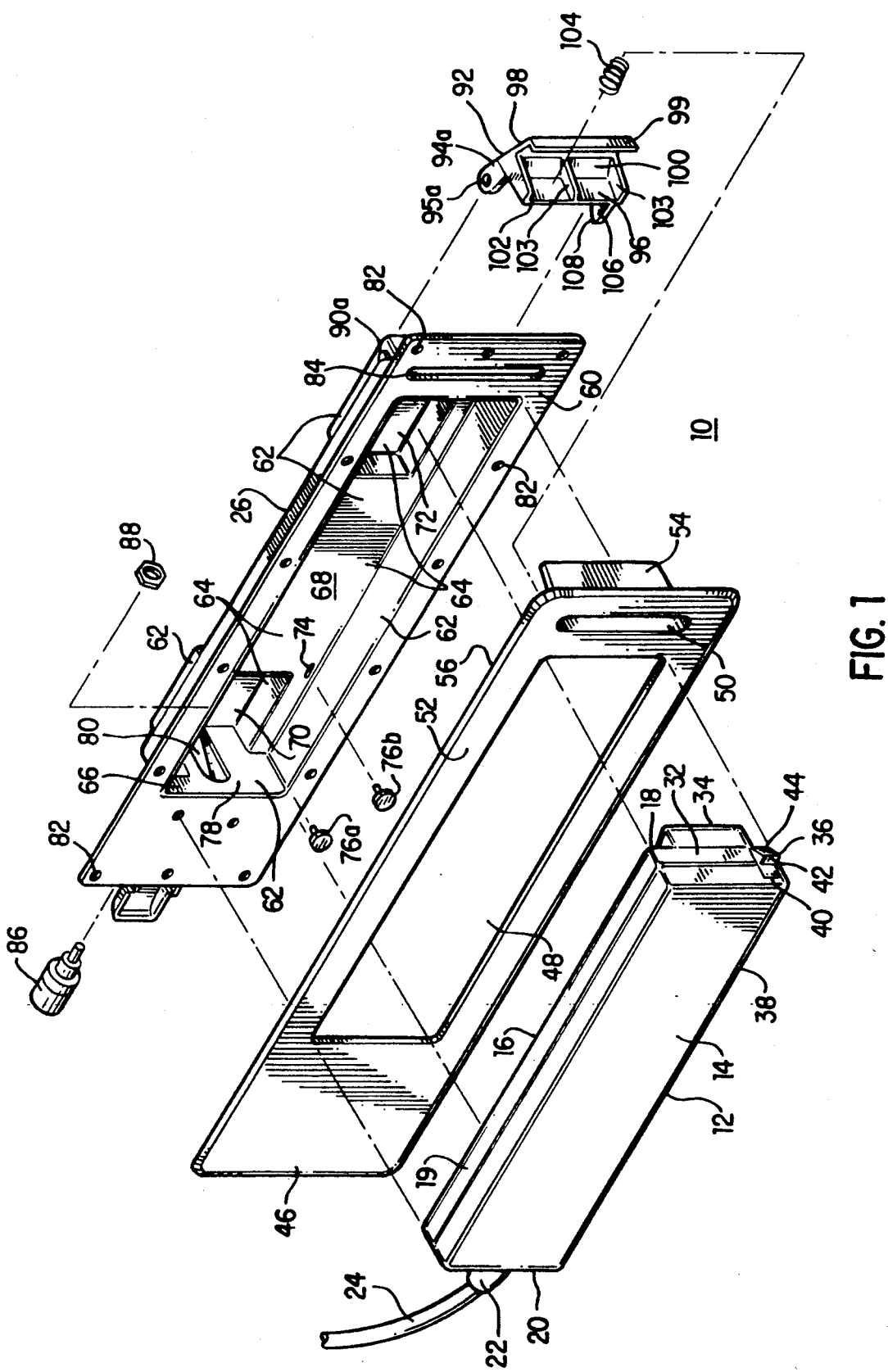
FIG. 1 is an exploded perspective view of a hand-held telephone pay station and an associated holder in accordance with the present invention.

The above-mentioned "Holder and Credit Card Unlatching Mechanism for a Hand Held-Telephone" U.S. patent application, of which the present application is a continuation-in-part and which is incorporated herein by reference, discloses a first preferred embodiment of the present invention. The present application describes a second preferred embodiment of the present invention.

A telephone and holder pay station assembly 10 constructed in accordance with the teachings of the present invention is shown in an exploded, perspective view in FIG. 1. Assembly 10 incorporates a handset 12. A perspective view of handset 12 showing a back surface 14 thereof is illustrated in FIG. 1, and a perspective view of handset 12 showing a keypad surface 16 thereof is illustrated in FIG. 7. Surfaces 14 and 16 oppose one another on handset 12.

With reference to FIGS. 1 and 7, handset 12 serves as a hand-held, pay telephone and incorporates a credit-card slot 18. Credit-card slot 18 extends longitudinally throughout keypad surface 16, near a top surface 19 of handset 12. Credit-card slot 18 in connection with a card reader (not shown) permits handset 12 to read a magnetic strip on customer's credit-card to obtain an account number so that the customer's charge-card account may be charged for a telecommunications service provided by handset 12.

FIGS. 1 and 7 additionally illustrate that handset 12 generally resembles a rectangular shape which is interrupted by several protrusions. Back surface 14 of handset 12 is a relatively flat surface. However, at a left end 20 of handset 12, a collar 22 protrudes outward from handset 12 and serves as a strain relief for an electrical cable 24 which couples handset 12 to other telecommunications circuitry (not shown). In addition, collar 22 serves a function, discussed below, related to securing handset 12 in a handset holder 26. Collar 22 may be provided by a conventional cable grommet or by a molded portion of handset 12.

Keypad surface 16 includes keypads 28, which are used in a conventional manner for entering telephone numbers and other data. Moreover, keypad surface 16 incorporates a microphone protrusion 30 proximate left end 20. Microphone protrusion 30 houses a microphone for transducing audible sounds into electrical signals. Near a right end 32 of handset 12, keypad surface 16 incorporates a speaker protrusion 34 which houses a speaker for transducing electrical signals into audible sounds.

In addition, handset 12 incorporates a latching protrusion 36 extending outward from handset 12 at right end 32. Latching protrusion 36 resides on right end 32 proximate a bottom surface 38 of handset 12. In addition, right end 32 incorporates a latching recess 40, which resides adjacent to latching protrusion 36, between latching protrusion 36 and back surface 14. A first portion of blocking surface 42 is formed by a wall of latching recess 40. This first portion of surface 42 resides on the keypad surface 16 side of recess 40. A second portion of blocking surface 42 resides on the wall of latching protrusion 36 which resides on the back surface 14 side of protrusion 36. Blocking surface 42 resides substantially parallel to back surface 14. In addition, latching protrusion 36 includes a ramped surface 44 which slopes from right end 32, at its intersection intersects blocking surface 42.

As shown in FIG. 1, a face plate or bezel 46 forms a portion of assembly 10 of the present invention. Face plate 46 is a generally coplanar member which is formed as an integral unit by a conventional molding process. Face plate 46 includes a handset opening 48 therethrough. Opening 48 is shaped to conform to the dimensions of handset 12 but is slightly larger than handset 12 so that handset 12 may be easily inserted through opening 48.

Face plate 46 additionally incorporates a credit-card slot 50 at an outward surface 52 of face plate 46. Credit-card slot 50 forms an opening into a credit-card guide 54 which protrudes away from an inward surface 56 of face plate 46. Credit-card guide 54 and credit-card slot 50 are together dimensioned to conform to the thickness and width dimensions of a conventional credit or charge card. Consequently, such a credit card may be easily, yet snugly, inserted into credit-card slot 50 and through credit-card guide 54 from outward surface 52 of face plate 46. While permitting unencumbered insertion of a credit card, slot 50 is advantageously thin enough to block introduction of pencils and other like objects. Consequently, unnecessary tampering with assembly 10 is discouraged.

In addition, face plate 46 includes a plurality of protruding receptacles (not shown) which extend away from inward surface 56 of face plate 46 and accommodate self-tapping screws 58, which are shown in FIG. 4 and operate to attach handset holder 26 to face plate 46.

As indicated in FIG. 1 and shown in more detail in FIGS. 2 through 5, handset holder 26 attaches at an outward surface 60 thereof to inward surface 56 of face plate 46. Holder 26 is an integrally formed, molded unit which, in addition to outward surface 60, includes cavity walls 62. Cavity walls 62 generally protrude inward from outward surface 60 of holder 26 and define a handset-receiving cavity 64. Cavity 64 is generally defined by an outward opening 66 through outward surface 60 of holder 26, a handset channel 68, which is generally rectangular in shape and dimensioned to conform to and accommodate handset 12. In addition, cavity walls 62 are formed to define a microphone cup 70 and a speaker cup 72, each of which extend cavity 64 inward from handset channel 68. Microphone cup 70 and speaker cup 72 are dimensioned to accommodate microphone protrusion 30 and speaker protrusion 34, respectively, of handset 12. In addition, cavity walls 62 are dimensioned so that when handset 12 is secured within holder 26, back surface 14 of handset 12 resides substantially coplanar with outside surface 52 of face plate 46, as shown in FIG. 3.

Cavity walls 62 include holes 74, only one of which is visible in FIG. 1. Holes 74 are located proximate the handset channel 68 portion of cavity 64. Compressive resilient members 76a and 76b are press-fitted into holes 74 so that compressive members 76a-76b reside within cavity 64. Compressive members 76a-76b are fabricated from a resilient substance, such as a spongy rubber or the like. Members 76a-76b compress when handset 12 is secured within holder 26 due to contact with handset 12, as shown in a cut-away portion of FIG. 3. Once compressed, compressive members 76a-76b each exert a force on handset 12 in a direction which tends to cause compressive members 76a-76b to return to their uncompressed shape. In other words, when handset 12 contacts and compresses members 76a-76b, members 76a-76b exert a force on handset 12 in a direction which urges handset 12 out from cavity 64 of holder 26.

With reference to FIGS. 1 and 6, a left end 78 of cavity walls 62 includes a collar opening 80, which is dimensioned to receive cable 24 and collar 22, discussed above in connection with handset 12. When handset 12 is inserted in cavity 64, a take-up reel (not shown) causes cable 24 to exit cavity 64 through opening 80. Once handset 12 is installed within cavity 64 of holder 26, the portion of cavity walls 62 which surrounds opening 80 contacts collar 22 and prevents collar 22 and handset 12 from moving in a direction outward from cavity 64.

Outward surface 60 of holder 26 includes a plurality of holes 82 (see FIG. 1) which are located to correspond to the inward protrusions on inward surface 56 of face plate 46, discussed above, so that screws 58 (see FIGURE 4) may be inserted therethrough to attach holder 26 to face plate 46. In addition, outward surface 60 includes a slot 84 which is dimensioned to accommodate the outside peripheral dimensions of credit-card guide 54, which protrudes inward from face plate 46. In other words, when face plate 46 and holder 26 are assembled together, credit-card guide 54 fits through surface 60 at slot 84, as shown in FIGS. 3 and 5, so that surface 60 on holder 26 reside adjacent to inward surface 56 of face plate 46 and the inwardly protruding receptacles (not shown) therefrom.

A hook switch 86 extends through another opening (not shown) in cavity walls 62, at end 78 thereof, as shown in FIGS. 1, 4, and 6. Hook switch 86 is attached in place by a nut 88. When handset 12 is installed within cavity 64, left end 20 of handset 12 contacts hook switch 86, causing hook switch 86 to electrically operate in a conventional manner.

As shown in FIGS. 1 and 4, cavity walls 62 additionally incorporate pivot pins 90a and 90b, which reside on the outward side of speaker cup 72. When handset 12 is secured in holder 26, pivot pin 90a resides on a side of cavity walls 62 which corresponds to top surface 19 of handset 12. Likewise, when handset 12 is secured within holder 26, pivot pin 90b resides on a side of cavity walls 62 which corresponds to bottom surface 38 of handset 12. In other words, when viewing FIG. 1, pivot pins 90a-90b project upward and downward, respectively, from the exterior side of cavity walls 62.

Pivot pins 90a-90b permit a latching mechanism 92 to pivotably couple to holder 26. Specifically, latching mechanism 92, which may also be referred to as a credit-card unlatching mechanism ("CCUM"), represents a member which is molded from a suitable plastic material in an integral unit. Latching mechanism 92 incorporates arms 94a and 94b which contain eyelets 95a and 95b, respectively. Eyelets 95a-95b are circular holes of suitable dimensions so that pivot pins 90a-90b, respectively, may be inserted therein to attach latching mechanism 92 to holder 26 while permitting latching mechanism 92 to pivot around pivot pins 90a-90b.

In addition, latching mechanism 92 includes a latch-release plate 96, which extends away from arms 94a-94b in a first direction, includes a credit-card engaging surface 98, which extends away from arms 94a-94b in a second direction, and includes a credit-card blocking surface 99, which extends away from surface 98. Generally speaking, surface 98 represents a plate which roughly extends in a plane defined by arms 94a-94b. Arms 94a-94b meet credit-card engaging surface 98 at an area of latching mechanism 92 generally referred to as intersection 100.

Intersection 100 also forms a first edge of latch-release plate 96. A second edge 102 of latch-release plate 96 opposes intersection 100. In addition, a plurality of ribs 103 extend along latch-release plate 96 between intersection 100 and second edge 102 to strengthen latching mechanism 92 and to position a spring 104, which resides between latch-release plate 96 and an outer surface of credit-card guide 54, as shown in FIG. 3.

Credit-card blocking surface 99 resides at an end of 100. Credit-card blocking surface 99 angles away from surface 98 in the general direction of extension for latch-release plate 96. Credit-card blocking surface 99 strengthens latching mechanism 92 and prevents slippage of a credit card against credit-card engaging surface 98 as handset 12 is being removed from holder 26.

Latching mechanism 92 additionally includes a latching finger 106. Latching finger 106 extends generally to the left, when viewing FIG. 1, from latch-release plate 96 proximate second edge 102 so that a cross-section of plate 96 and finger 106 together form an upside-down "J" shape, as shown in a cut-away portion of FIG. 3. Latching finger 106 operates in conjunction with a latching slot 108 (see FIGS. 3 and 4) and blocking surface 42 of handset 12. As latching mechanism 92 pivots around pivot pins 90a-90b, latching finger 106 travels through latching slot 108 in cavity walls 62 to engage or disengage blocking surface 42.

Latching finger 106 includes a handset engaging surface 110 that resides on the portion of latching finger 106 which opposes latch-release plate 96. Surface 110 is tapered in the present embodiment of the present invention so that the portion of surface 110 which is proximate arms 95a-95b is distally positioned from latch-release plate 96 Likewise, the portion of surface 110 which is distally positioned from arms 94a-94b is proximate plate 96. This slope on surface 110 aids the removal of handset 12 from holder 26, as discussed in more detail below.

Telephone holder 26 and face plate 46 may together be installed within an aircraft seat, bulkhead, or similar environment. Consequently, the particular techniques used to mount holder 26 and face plate 46 will vary depending on the particular application in which the present invention is used. However, the present invention contemplates the use of conventional techniques to mount holder 26 and face plate 46. Consequently, such mounting details may be readily arrived at by those skilled in the art who are aware of the description provided herein Referring to FIGS. 1-7, those skilled in the art can readily see that handset 12, face plate 46, holder 26, and latching mechanism 92 cooperate together so that handset 12 may be placed and secured in holder 26. Once secured, handset 12 cannot be inadvertently or unintentionally removed from holder 26, but easy removal from holder 26 is accomplished through the use of a credit card.

Specifically, with handset 12 in a user's hand, cable 24 extends from handset 12 through collar opening 80 to the take-up reel (not shown). Moreover, latching mechanism 92 resides in a latching position, in which latching finger 106 extends through latching slot 108. This latching position is substantially as shown in FIG. 3. The user may secure handset 12 in holder 26 by first placing left end 20 of handset 12 in cavity 64 of holder 26, proximate end 78 thereof. This placement causes microphone protrusion 30 of handset 12 to reside within microphone cup 70 of cavity 64, and causes collar 22 of handset 12 to reside within collar opening 80. Next, the user may simply push right end 32 of handset 12 toward the interior of holder 26. Such pushing causes ramped surface 44 of handset 12 to engage latching finger 106 at sloped surface 110 thereof.

Sloped surface 110 in particular, and ramped surface 44 to a lesser extent, are oriented relative to each other so that movement of handset 12 into cavity 64 causes latching finger 106 to move out of the latching position. In other words, latching finger 106 moves toward the right (when viewing FIG. 1) and out from cavity 64 a sufficient distance to permit handset 12 to enter cavity 64. Of course, movement of latching finger 106 is permitted due to the pivotable attachment of latching mechanism 92 to holder 26 at pivot points 90a-90b. Spring 104 urges latching finger 106 to enter cavity 64. Consequently, such movement of latching finger 106 is in opposition to spring 104.

As handset 12 is pushed further and further into cavity 64, latching finger 106 eventually encounters the end of ramped surface 44 at blocking surface 42 on handset 12. When this event happens, spring 104 forces latching mechanism 92 to pivot back into the latching position. When latching mechanism 92 is in the latching position, latching finger 106 engages blocking surface 42, and handset 12 is secured within holder 26. Moreover, speaker protrusion 34 resides within speaker cup 72 of cavity 64, and back surface 14 of handset 12 is substantially flush with outside surface 52 of face plate 46. In addition, handset 12, at keypad surface 16 thereof, contacts compressive resilient members 76a-76b in such a manner that members 76a-76b compress and remain compressed so long as handset 12 is secured within holder 26.

Handset 12 may be easily removed from holder 26 by the insertion of an appropriate implement, such as a credit card, into credit-card slot 50 of face plate 46. As this occurs, credit-card guide 54 guides the credit card as it travels from outward surface 52 until the credit card contacts or abuts engaging surface 98 of latching mechanism 92. Continued movement of the credit card into credit-card slot 50 causes latching mechanism 92 to pivot out of the latching position in a direction against the force applied by spring 104. This pivoting motion causes latching finger 106 to disengage blocking surface 42 of handset 12.

At this point, the outward force applied to handset 12 by compressive resilient members 76a-76b causes handset 12 to move a small distance out of cavity 64. By removing pressure from the credit card inserted in credit-card slot 50, spring 104 causes latching mechanism 92 to pivot toward the latching position. Such pivoting causes the credit card to move outward from credit-card slot 50. In addition, such pivoting causes latching finger 106 to engage ramped surface 44 of latching protrusion 36 on handset 12. Ramped surface 44 is configured so that the force applied by latching finger 106 toward handset 12 on ramped surface 44 causes handset 12 to move further outward from cavity 64 of holder 26. Consequently, after handset 12 has been moved outward from cavity 64 due to the forces supplied by compressive resilient members 76a- 76b and by latching finger 106 against ramp surface 44, the user may easily grasp handset 12 and remove handset 12 from holder 26. Cable 24 is supplied through collar opening 80 from the take-up reel (not shown) as handset 12 is pulled away from holder 26.

In summary, the present invention provides an improved holder and latching mechanism for a hand-held telephone. The holder and telephone together represent a compact, uncomplicated design which may be easily, inexpensively, and reliably manufactured for installation in a wide variety of applications. In addition, the flush securement of handset 12 within holder 26 discourages unnecessary tampering with the hand-held telephone. Moreover, handset 12 is firmly secured within holder 26 so that handset 12 does not become disengaged from holder 26 without such disengagement being intended.

The present invention has been described above with reference to a preferred embodiment. However, those skilled in the art will recognize that changes and modifications may be made to this preferred embodiment without departing from the scope of the present invention. Such changes and modifications which are obvious to those skilled in the art are intended to be included within the scope of the present invention.

What is claimed is:

1. A holder and a latch mechanism for releasably retaining a hand held telephone that has a latch protrusion formed on one end thereof and a latching recess formed adjacent to the latch protrusion, comprising a generally open sided telephone holder formed by integral end, side, and bottom walls defining a longitudinal telephone receiving cavity with a latch opening formed in a latch end wall proximate to a position that would be occupied by the latching recess on the telephone when the latter is placed within the cavity, said cavity having pivot pin means formed on the outer surface thereof also proximate to the latching end wall, and said cavity having at least one compressive resilient button fastened to a bottom wall thereof adapted to be in engagement with a surface of the telephone when the latter is placed in said cavity, a face plate of generally rectangular configuration adhered to the holder walls, said face plate overextending the walls to define a flange, said face plate having a telephone receiving opening formed therein and also having a generally credit card width slot formed therein at the latching end of the face plate, and said face plate being provided with a hollow sleeve extending inwardly of said slot, and a latching mechanism disposed outside the latching end of the cavity comprising a pair of arms pivotably engaged with the pivot pin means, a latch plate extending between said arms having a card engaging surface extending therefrom in an outward orientation to the cavity, and a latching finger extending therefrom into said cavity, and compressive spring means disposed between the latch plate and said hollow sleeve to normally bias the latching finger into the cavity in a position where it will engage into the latching recess on the telephone, and yet permitting the latching finger to be pivoted out of the path of the latch protrusion, or out of the latching recess when an overcoming force is applied to the card engaging surface by the insertion of a thin implement, such as a credit card, through the card slot and hollow sleeve whereby the telephone hand set is freed and biased out of the cavity by expansion of the compressible resilient button.

* * * * *